Jan. 9, 1951 A. J. GRANBERG 2,537,266
AIRPLANE FUELING SYSTEM
Filed Jan. 18, 1947 2 Sheets-Sheet 1
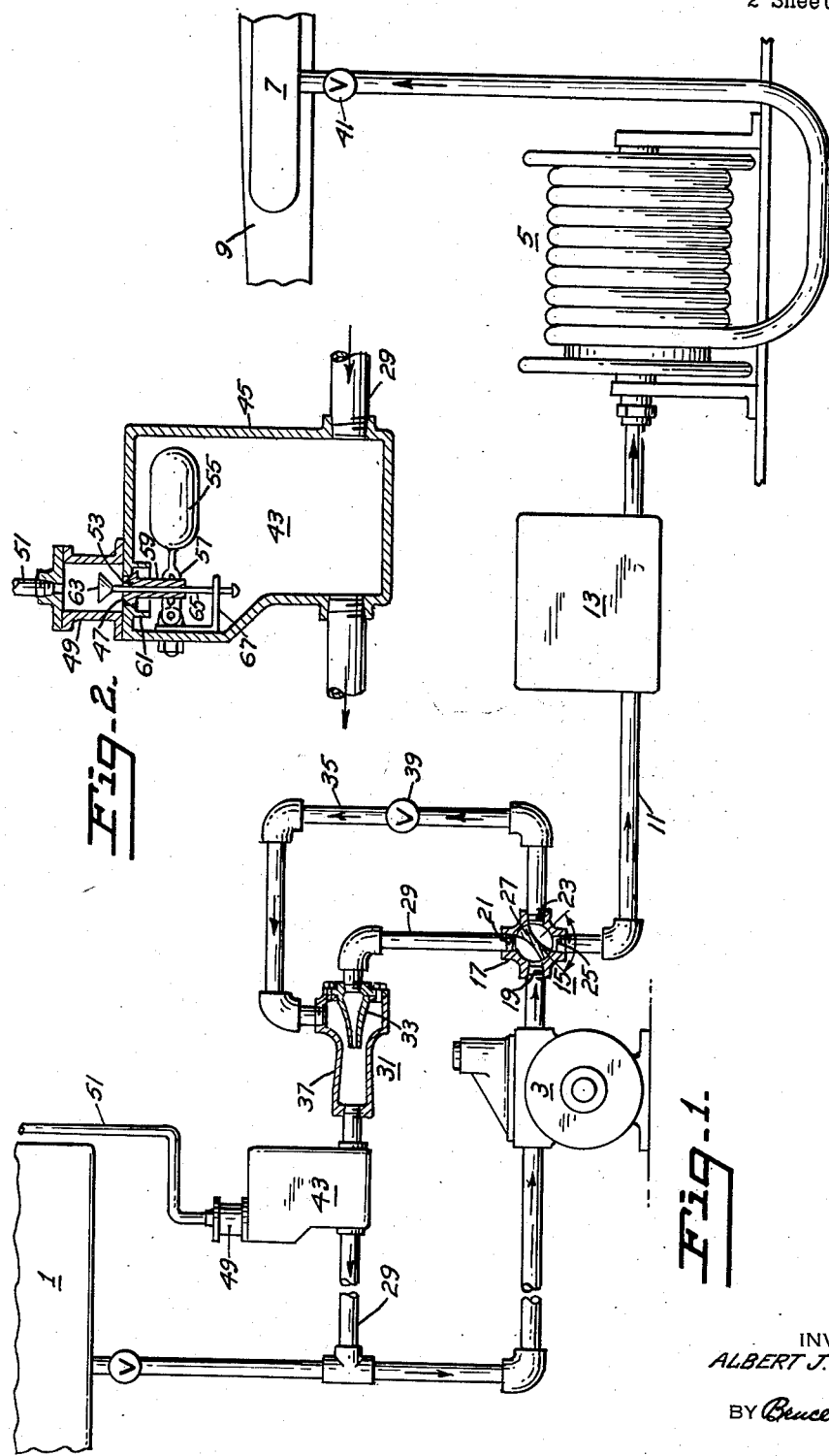
INVENTOR
ALBERT J. GRANBERG
BY Bruce & Bresler
HIS ATTORNEYS

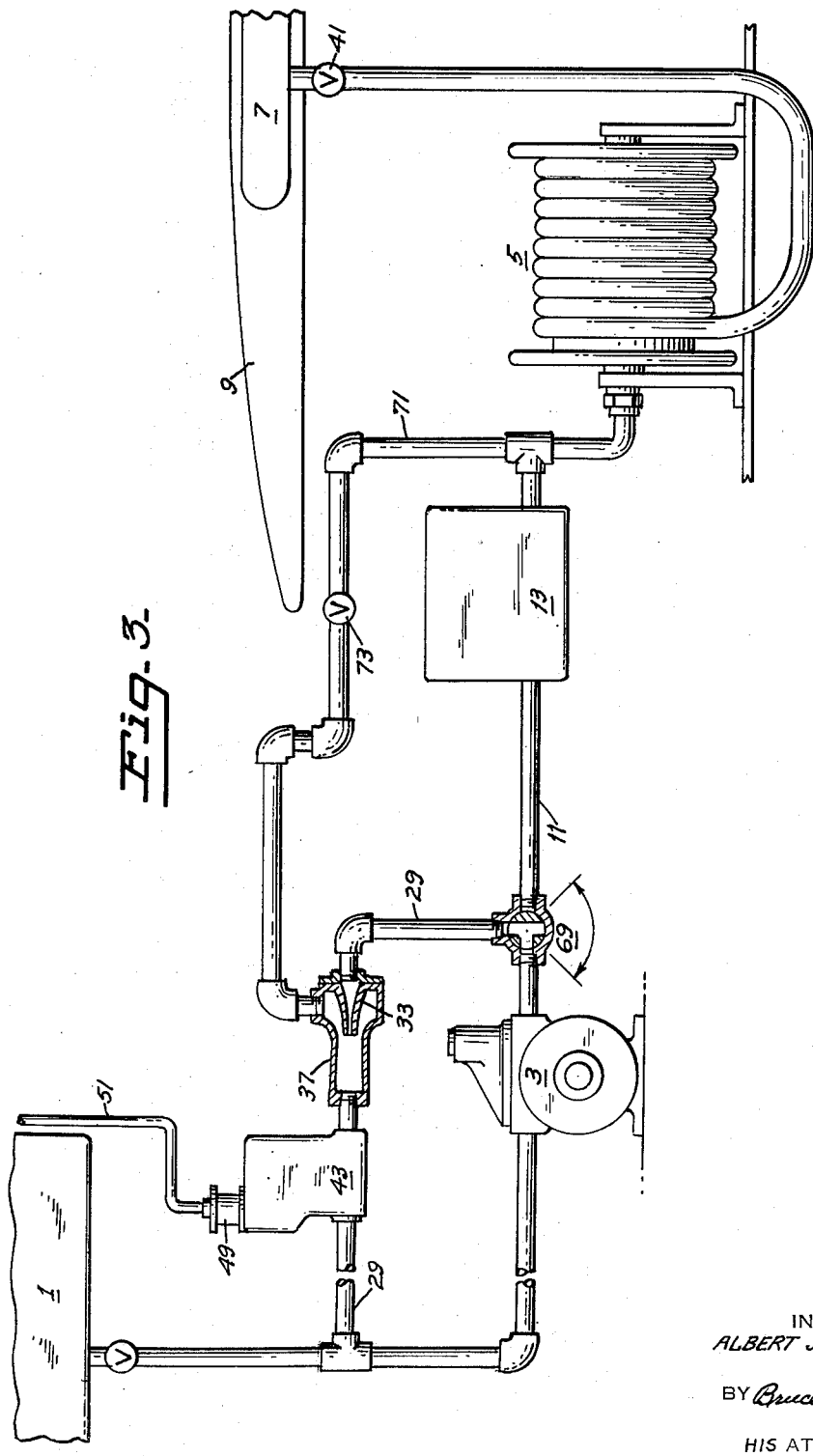

Patented Jan. 9, 1951

2,537,266

UNITED STATES PATENT OFFICE 2,537,266

AIRPLANE FUELING SYSTEM

Albert J. Granberg, Oakland, Calif.

Application January 18, 1947, Serial No. 722,874

3 Claims. (Cl. 222—318)

My invention relates to an airplane fueling system and more particularly to a fueling system for use on a tank truck for refueling planes on the field.

Various means are employed in the refueling of aircraft on landing fields. According to one method which has found favor over many of the others, a tank truck is driven onto the field and parked as close as possible to the plane, and beneath the wing of the plane if possible, when the wing provides sufficient clearance for the purpose.

In the larger type of planes, the gas or fuel tanks are located in the wings. This necessitates lifting the hose and nozzle for connection to such tanks. Ordinarily, such hose is of soft, light canvas construction, making the hose of light weight and portable in its collapsed condition. However, if the liquid is not removed from the hose following a fueling operation, a substantial weight builds up in that portion of the line leading up to the tank. Upon disconnection of the nozzle from the fuel tank of the plane, the operator accordingly has a heavy load on his hands which must be lifted some twenty or thirty feet each time a plane of that type is to be refueled.

Attempts to drain the hose back into the truck tank by reversing the truck fuel pump have not proven too satisfactory, for the pump, particularly if of the impeller type, does not work efficiently in reverse, and this situation is aggravated if the pump is somewhat worn.

The solution is further complicated by the fact that air is apt to be drawn into the pump during such draining operation, thus causing the pump to become airbound before the hoseline has been completely evacuated. This creates a difficult situation from the point of view of realizing proper operation of the system.

Among the objects of my invention are:

(1) To provide a novel and improved fueling system for aircraft;

(2) To provide a novel and improved tank truck fueling system for aircraft;

(3) To provide a novel and improved aircraft fueling system permitting draining of the hoseline at the termination of each fueling operation, and with no danger of rendering the pump airbound;

(4) To provide a novel and improved aircraft fueling system designed to drain the hoseline without the necessity of reverse running of the system pump.

Additional objects of my invention will be brought out in the following description of preferred embodiments of the same, taken in conjunction with the accompanying drawings wherein—

Figure 1 is a view depicting my novel and improved fueling system in its preferred form;

Figure 2 is an enlarged view in section of an air separator embodied in such system; and Figure 3 is a view depicting a modified form of my novel and improved fueling system.

Referring to the drawings for a detailed description of my novel and improved aircraft fueling system, I have depicted the same therein based on a conventional type tank truck fueling system.

Such truck type system includes a truck or storage tank 1 from which gas is pumped by a main pump 3 through a reel-wound hose 5 to the gas tank 7 which is to be filled. In the present case, such gas tank is one located in the wing structure 9 of an airplane. In the line 11 from the pump to the hose, there is installed a conventional type air separator and meter assembly 13 for measuring the quantity of gasoline being pumped into the gas tank.

In converting such system to the improved system of my invention, I include in the line between the main pump and the air separator-meter assembly, a four-way valve 15. This four-way valve comprises a valve housing 17 having four pipe openings 19, 21, 23 and 25 therein, and a partition type valve rotor 27 adapted to interconnect adjacent openings in pairs. A pair of such adjacent openings 19 and 25 provide the means for placing the pump in communication with the hoseline through the line 11. Connected between the truck tank and the other valve housing opening 21 adjacent the pump connection opening 19 is a line 29 including a nozzle-Venturi pump 31 with the nozzle 33.

To the last remaining valve housing opening 23, I connect a line 35 which terminates in the venturi 37 of the nozzle-Venturi pump, and in such line I include a conventional type valve 39 adapted to alter the effective passage through the line 35.

In one position of the four-way valve, the main pump will be connected to the hoseline for pumping fuel into the gas tank of the plane. By adjusting the valve to the position illustrated in the drawing, the hoseline is disconnected from the main pump and in turn is connected to the venturi, while the main pump is automatically switched to the nozzle and discharges therethrough to create a region of reduced pressure in the venturi. This results in a withdrawal or draining of liquid from the hoseline and a discharging of the same back into the storage tank, except for that required by the main pump in its operation.

In this manner, the hose may be drained while maintaining the main pump running in the same direction as when pumping liquid through the hoseline to the gas tank to be filled.

The nozzle-Venturi assembly broadly constitutes an auxiliary pump for effecting the draining of the hoseline, and while other types of pumps may be utilized as auxiliary pumps in this connection, the embodiment of my invention illustrated and described above is to be preferred.

To avoid collapse of the hose during such draining, an air inlet valve 41 is installed in the hoseline, preferably adjacent the discharge nozzle, for admitting air to the hoseline in response to reduction in pressure in the hoseline during draining of the liquid therefrom. A ball valve would be suitable for the purpose.

The air thus taken in, displaces the liquid as it is drained from the hose, thereby assuring against the probable collapse of the hose at some intermediate point, which would leave the discharge end of the hose full of liquid to defeat the purpose of the system.

In draining the gasoline from the hoseline back to the storage tank, it is desirable to remove as much of the entrapped air as possible from such gasoline before it re-enters the tank. For this purpose I provide an air separator 43 in the line 29 on the discharge side of the venturi.

Such air separator includes an air separator chamber 45 having a valve opening 47 in the upper end thereof, covered by a valve housing 49. This valve housing is provided with a vent connection 51 leading to the upper part of the storage tank at a point above the liquid level therein.

Within the air separator chamber, I provide a valve 53 for closing the valve opening when the level of liquid in the air separator chamber reaches a predetermined level. For this purpose, such valve is controlled by a float 55 mounted at the end of a moment arm 57 which is hinged to a wall of the air separator chamber. Such moment arm is preferably of forked construction to receive the stem 59 of the valve.

A pin and slot connection between the valve stem and the float moment arm will cause the valve component to rise and fall with the float, in which movement it is supported against lateral movement by a plurality of guides 61 around the valve opening.

Thus, as the liquid level in the air separator rises in response to draining of gasoline from the hoseline, the air in the gasoline which naturally has a tendency to separate out, will be forced out from the air separator chamber to the air space above the gasoline in the storage tank.

During a re-fueling operation, it will become apparent that whatever liquid will be in the air separator chamber will be drawn therefrom along with liquid from the storage tank and pumped into the hoseline. In the absence of some precautionary measure, air from the storage tank will be drawn into the air separator chamber as the liquid level in such air separator chamber drops. Ultimately, therefore, such air will enter the suction line of the main pump and cause the same to become airbound.

To preclude such a possibility, I provide a valve 63 in the valve housing 49 above the air separation chamber, which valve is adapted to close the valve opening, when the float drops in response to a lowering of the liquid level and removes its associated valve element from such valve opening.

The valve 63 is of inverted conical shape and provided with a depending valve stem 65 extending down through an axial bore in the float-controlled valve, which latter valve thus functions as a guide for the other. At its lower end, the stem passes through a perforation in a wall bracket 67 and terminates in an end of larger diameter than the opening in the bracket to limit the permissible upward travel of this valve.

The inverted conical valve should be sufficiently light in weight so as not to preclude exhausting of the air from the air separator chamber as the level in such chamber rises and builds up pressure therein during draining of the hoseline.

In the modified version of the invention as depicted in Figure 3, a three-way valve 69 is substituted for the four-way valve 15 of Figure 1, and the connection 71 to the venturi is taken off at some point in the main pump discharge line 11 and preferably at a point between the air separator-meter assembly and the hoseline. Like in the corresponding connection 35 of Figure 1, a valve 73 is included in this connection.

During a re-fueling operation, the three-way valve is adjusted so as to block the line to the nozzle and connect the pump to the hoseline. For draining the hoseline, the three-way valve is adjusted to the position indicated in Figure 3, whereby the discharge line to the hoseline is blocked and a connection is effected between the main pump and the nozzle.

During re-fueling, the connection to the venturi is preferably closed off by the valve 73 to avoid diversion of a portion of the main pump output, back to the suction line of the pump to thereby unnecessarily restrict the useful output of the pump and at the same time cause inaccurate indications on the meter relative to the amount of liquid pumped into the tank of the plane.

In the system of Figure 1, such problem would not occur, for during a re-fueling operation the venturi and nozzle are both disconnected from the discharge side of the main pump.

From the above description of my invention, it will become apparent that the same fulfills all the objects recited therefor, and while I have described my invention in considerable detail, I do not wish to be limited in my protection to such detail, except as may be necessitated by the appended claims.

I claim:

1. In a fueling system of the type involving a storage tank, a hoseline, a pump having its suction side connected to said storage tank and its discharge side connected to said hoseline; means for draining said hoseline back to said storage tank following a fueling operation, said means comprising a nozzle-Venturi assembly, means connecting the input side of said venturi to said hoseline and the discharge end thereof to said storage tank, means for switching said pump from its connection to said hoseline to said nozzle, and valve means responsive to subatmospheric pressure in said hose line for admitting air to said hoseline as the liquid is drained therefrom.

2. In a fueling system of the type involving a storage tank, a hoseline, a pump having its suction side connected to said storage tank and its discharge side connected to said hoseline; means for draining said hoseline back to said storage tank following a fueling operation, said means comprising a nozzle-Venturi assembly, means connecting the input side of said venturi to said hoseline and the discharge end thereof to said storage tank, means for switching said pump from its connection to said hoseline to said nozzle, valve means responsive to subatmospheric pressure in said hose line for admitting air to said hose line as the liquid is drained therefrom and air separating means in said system on the discharge side of said venturi for removing entrapped air from the liquid drained back to said storage tank.

3. In a fueling system of the type involving a storage tank, a hose line, a main pump having its suction side connected to said storage tank and its discharge side connected to said hose line; means for draining said hose line back to said storage tank following a fueling operation, said means comprising an auxiliary pump, means connecting the input side of said auxiliary pump to said hose line and the discharge end thereof to said storage tank, means for operating said auxiliary pump upon disconnection of said main pump from said hose line, and valve means in said hose line in proximity to the discharge end thereof and responsive to sub-atmospheric pressure in said hose line for admitting air to said hose line as the liquid is drained therefrom.

ALBERT J. GRANBERG.

REFERENCES CITED

The following references are of record in the file of this patent:

UNITED STATES PATENTS

| Number | Name | Date |
|---|---|---|
| 2,017,345 | Granberg | Oct. 15, 1935 |
| 2,112,290 | Holland | Mar. 29, 1938 |
| 2,148,131 | Parker | Feb. 21, 1939 |
| 2,362,559 | Jauch et al. | Nov. 14, 1944 |
| 2,415,019 | McMahan | Jan. 28, 1947 |